United States Patent
Kawaguchi

(10) Patent No.: US 8,350,918 B2
(45) Date of Patent: Jan. 8, 2013

(54) IMAGE CAPTURING APPARATUS AND CONTROL METHOD THEREFOR

(75) Inventor: Zenya Kawaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 12/512,725

(22) Filed: Jul. 30, 2009

(65) Prior Publication Data

US 2010/0033591 A1   Feb. 11, 2010

(30) Foreign Application Priority Data

Aug. 5, 2008   (JP) .................................. 2008-202419

(51) Int. Cl.
    *H04N 5/225* (2006.01)
(52) U.S. Cl. ............... 348/220.1; 348/208.1; 348/208.8; 348/222.1
(58) Field of Classification Search ............... 348/220.1, 348/208.1–208.8, 222.1; 382/118
    See application file for complete search history.

(56) References Cited

U.S. PATENT DOCUMENTS

| | | | |
|---|---|---|---|
| 5,982,912 | A | 11/1999 | Fukui et al. |
| 6,996,340 | B2 | 2/2006 | Yamaguchi et al. |
| 7,248,300 | B1 | 7/2007 | Ono |
| 2007/0115459 | A1 * | 5/2007 | Nakao et al. .................. 356/213 |

FOREIGN PATENT DOCUMENTS

| | | |
|---|---|---|
| JP | 06-032154 | 2/1994 |
| JP | 09-251534 | 9/1997 |
| JP | 2000-347277 | 12/2000 |
| JP | 2004-294498 | 10/2004 |
| JP | 2006-237803 A | 9/2006 |
| JP | 2008-109485 A | 5/2008 |

OTHER PUBLICATIONS

"Face Recognition Using Eigenfaces" Proc. of IEEE Conf. on Computer Vision and Pattern Recognition, pp. 586-591, 1991, Matthew A. Turk and Alex P. Pentland.

* cited by examiner

*Primary Examiner* — Yogesh Aggarwal

(74) *Attorney, Agent, or Firm* — Cowan, Liebowitz & Latman, P.C.

(57) ABSTRACT

In an image capturing apparatus with an operation mode for carrying out expression detection, it is determined whether or not the image capturing apparatus is operated in the operation mode for carrying out expression detection. In a case in which the image capturing apparatus is operated in the operation mode for carrying out expression detection, setting in such a way that images with a resolution higher than in a case in which the image capturing apparatus is not operated in the operation mode are read out from an image sensor allows the expression of a face of a person to be detected efficiently.

5 Claims, 6 Drawing Sheets

F I G. 3
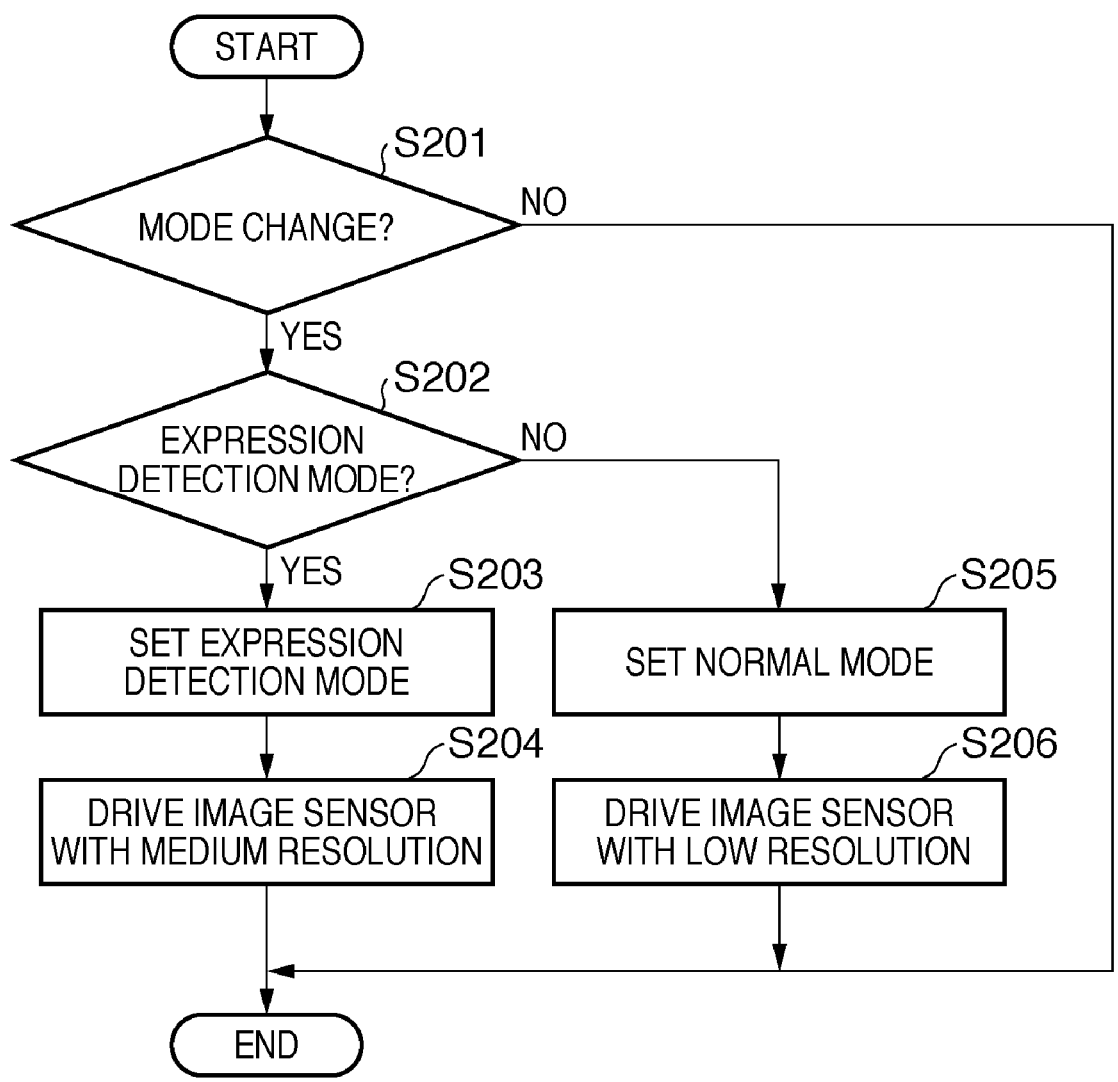

IMAGE CAPTURING APPARATUS AND CONTROL METHOD THEREFOR

BACKGROUND OF THE INVENTION

1. Field of the Invention

The present invention relates to an image capturing apparatus and a control method therefor, and more particularly, to an image capturing apparatus which has a function of determining an expression of a subject, and a control method therefor.

2. Description of the Related Art

In a case in which a subject, in particular a person, is photographed using an image capturing apparatus such as a digital still camera, in addition to proper exposure and focusing it is desired that photographs that satisfy the person photographed, such as those with unclosed eyes and a bright facial expression, be taken.

In order to meet such requirements, Japanese Patent Laid-Open No. 2000-347277 discloses a camera for detecting changes of the eyes of a subject, such as blinks and the direction of line of sight, and carrying out shooting when predetermined shooting criteria are satisfied. Furthermore, Japanese Patent Laid-Open No. 2004-294498 discloses a system for carrying out automatic shooting by detecting a desirable expression or posing of a subject.

In recent years, with advances in semiconductor technology, the number of pixels of a sensor to be used for digital cameras and the like has exceeded ten million, thereby allowing images with higher resolutions to be captured. However, images with higher resolutions are not always captured, as images with lower resolutions are also captured depending on applications or settings. For example, images for recording moving images and images for displaying the appearance of subjects in electronic viewfinders in real time generally are given lower resolutions in order to reduce a processing load and the number of pixels that can be displayed on a display device.

Almost all of the pixels of an image sensor are read out in a case in which images with higher resolutions are to be obtained, whereas pixels are thinned out for reading or pixels are both thinned out and added for reading in a case in which images with lower resolutions are to be obtained.

Furthermore, images with lower resolutions can also have multiple resolutions, such as VGA moving images (640×480 pixels) and QVGA (320×240 pixels).

However, in a case in which changes in the state of the eyes of a person or expressions of the person are to be detected from images, the use of images with lower resolutions will result in lower detection rates because the images with lower resolutions produce less variations in the shape of the eyes or mouth than images with higher resolutions. Furthermore, in a case in which the face has a small ratio in images shot before thinning out pixels, the detection accuracy for the eyes and mouth is decreased in images with lower resolutions. Therefore, changes in the shape of the eyes or mouth will be even more difficult to detect, leading to failure to detect the change or an increase in the false detection rate.

If images with higher resolution are used to detect changes in the state of the eyes or to detect expressions, the false detection rate will likely be decreased. However, in a case in which images with higher resolutions are to be obtained, the reading time per image is increases compared to images with lower resolutions. As a result, the number of pixels that can be read per unit of time (frame rate) decreases. More specifically, the detection interval lengthens, decreasing trackability of the movements of the person. It is also possible to increase the operation speed of the image sensor to try to reduce the reading time for images with higher resolutions, but this increases power consumption.

SUMMARY OF THE INVENTION

The present invention is conceived in light of the problems of the conventional art described above, and provides an image capturing apparatus which is able to efficiently detect the expression of a face of a person, and a control method therefor.

According to an aspect of the present invention, there is provided an image capturing apparatus comprising: an image capturing unit configured to generate image signals by converting an optical image of a subject into electrical signals on a pixel-by-pixel basis, the image capturing unit capable of outputting image signals with multiple resolutions; a face detecting unit configured to detect a face region of a person from image signals output from the image capturing unit; an expression detecting unit configured to detect an expression of the person from image signals corresponding to the face region, among the image signals output from the image capturing unit; a determination unit configured to determine whether the image capturing apparatus is operated in a first operation mode using the expression detecting unit or in a second operation mode without the use of the expression detecting unit; and a control unit configured to control the image capturing unit to output image signals with a first resolution higher than a second resolution and to provide the image signals with the first resolution to at least the expression detecting unit of the face detecting unit and the expression detecting unit in a case in which the determination unit determines that the image capturing apparatus is operated in the first operation mode, wherein the second resolution is a resolution with which image signals are to be output by the image capturing unit in a case in which it is determined that the image capturing apparatus is operated in the second operation mode.

According to another aspect of the present invention, there is provided a control method for an image capturing apparatus that comprises: an image capturing unit configured to generating image signals by converting an optical image of a subject into electrical signals on a pixel-by-pixel basis, the image capturing unit capable of outputting image signals with multiple resolutions; a face detecting unit configured to detecting a face region of a person from image signals output from the image capturing unit; and an expression detecting unit configured to detecting an expression of the person from a region corresponding to the face region, among image signals output from the image capturing unit, the control method comprising: a determination step of determining whether the image capturing apparatus is operated in a first operation mode using the expression detecting unit or in a second operation mode without the use of the expression detecting unit; and a control step of controlling the image capturing unit to output image signals with a first resolution higher than a second resolution and to provide the image signals with the first resolution to at least the expression detecting unit of the face detecting unit and the expression detecting unit in a case in which it is determined by the determination step that the image capturing apparatus is operated in the first operation mode, wherein the second resolution is a resolution with which image signals are to be output by the image capturing unit in a case in which it is determined that the image capturing apparatus is operated in the second operation mode.

Further features of the present invention will become apparent from the following description of exemplary embodiments with reference to the attached drawings.

BRIEF DESCRIPTION OF THE DRAWINGS

FIG. 3 is a flowchart showing switching a driving method for an image sensor in a digital camera according to the first embodiment of the present invention;

DESCRIPTION OF THE EMBODIMENTS

Exemplary embodiments of the present invention will now be described in detail in accordance with the accompanying drawings.

First Embodiment

Figure 1:
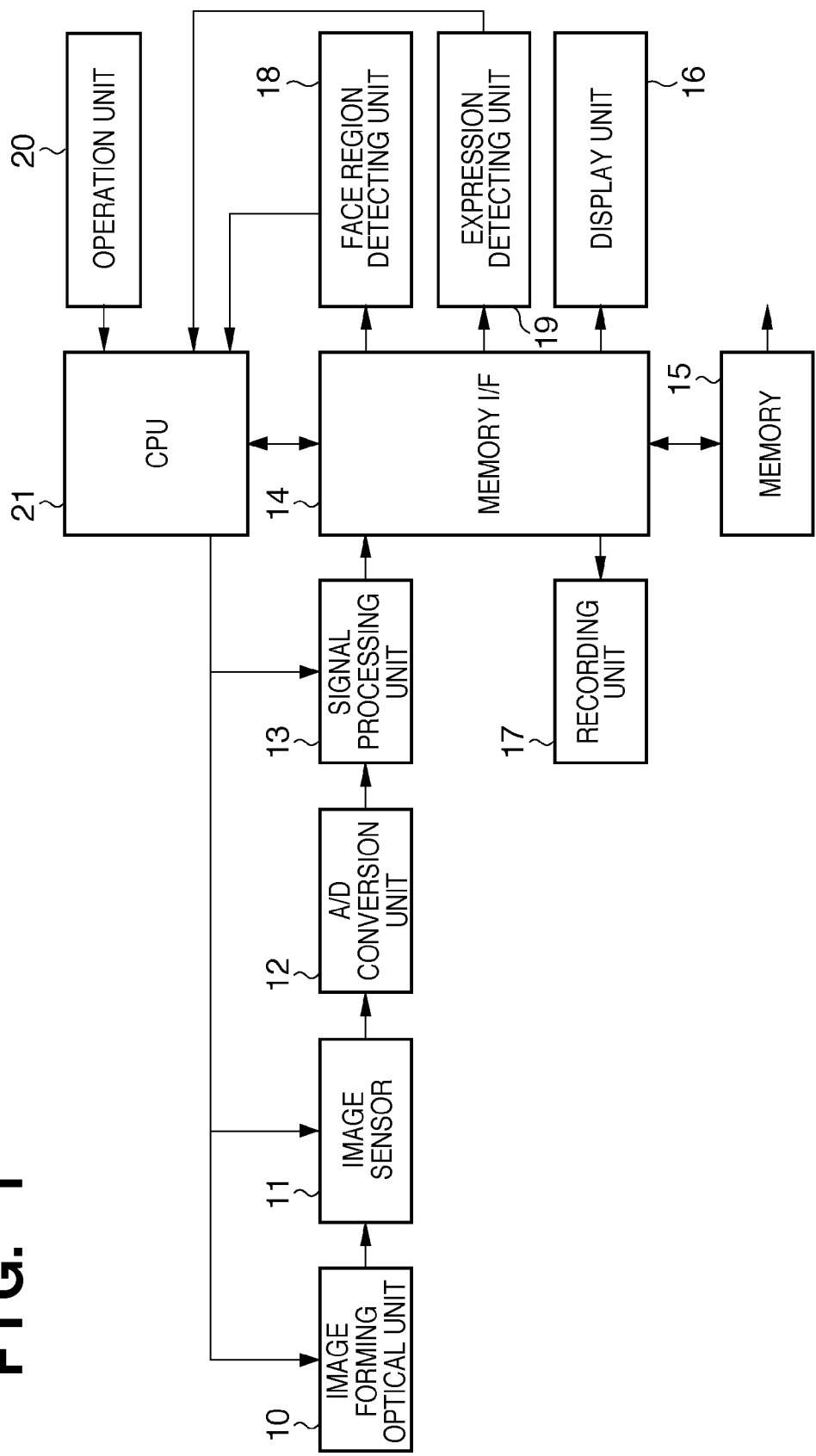
FIG. 1 is a block diagram illustrating a functional configuration example of a digital camera as an example of an image capturing apparatus according to a first embodiment of the present invention.

FIG. 1 is a block diagram illustrating a functional configuration example of a digital camera as an example of an image capturing apparatus according to a first embodiment of the present invention.

In the figure, an image forming optical unit 10 is composed of a lens and an aperture, and caries out focusing and controls exposure in accordance with control exercised by a CPU 21.

An image sensor 11 is a solid-state image sensor such as, for example, a CCD image sensor or a CMOS image sensor, in which an optical image formed on the image sensor 11 by the image forming optical unit 10 is converted into electrical signals on a pixel-by-pixel basis. An A/D conversion unit 12 converts analog image signals that are output signals from the image sensor 11 into digital image signals. A signal processing unit 13 applies gamma processing, interpolation processing, matrix conversion, etc. to output signals from the A/D conversion unit 12 to generate color image signals with a format such as a pair consisting of a luminance signal (Y) and a color signal (UV), or an RGB signal.

A memory 15 is, for example, a DRAM, in which image signals, etc. can be stored temporarily.

A memory I/F 14 controls writing and reading of image signals and various types of control signals between the memory 15 and the other components. A display unit 16 is, for example, an LCD, which displays image data, etc. A recording unit 17 compresses shot images, and records the compressed images on a removable medium such as a memory card or an optical disc, or on recording media such as built-in media.

A face region detecting unit 18 detects a region (face region) considered a face of a person from image signals output by the signal processing unit 13. The face region detecting unit 18 has a function of converting image signals read out from the memory 15 via the memory I/F 14 to a certain resolution.

An expression detecting unit 19 detects an expression (for example, a smile) as a criterion for shooting or an expression (for example, closed eyes) as a criterion for no shooting, for image signals, more specifically, for a face region detected by the face region detecting unit 18.

An operation unit 20 is a group of input devices for the user to provide instructions and settings to the digital camera, and includes a shutter button, a direction key, a menu button, a set button, etc.

The CPU 21 controls the entire operation of the digital camera by executing a pre-stored control program. Furthermore, the CPU 21 determines the operation mode of the digital camera on the basis of user operation of the operation unit 20.

Figure 2:
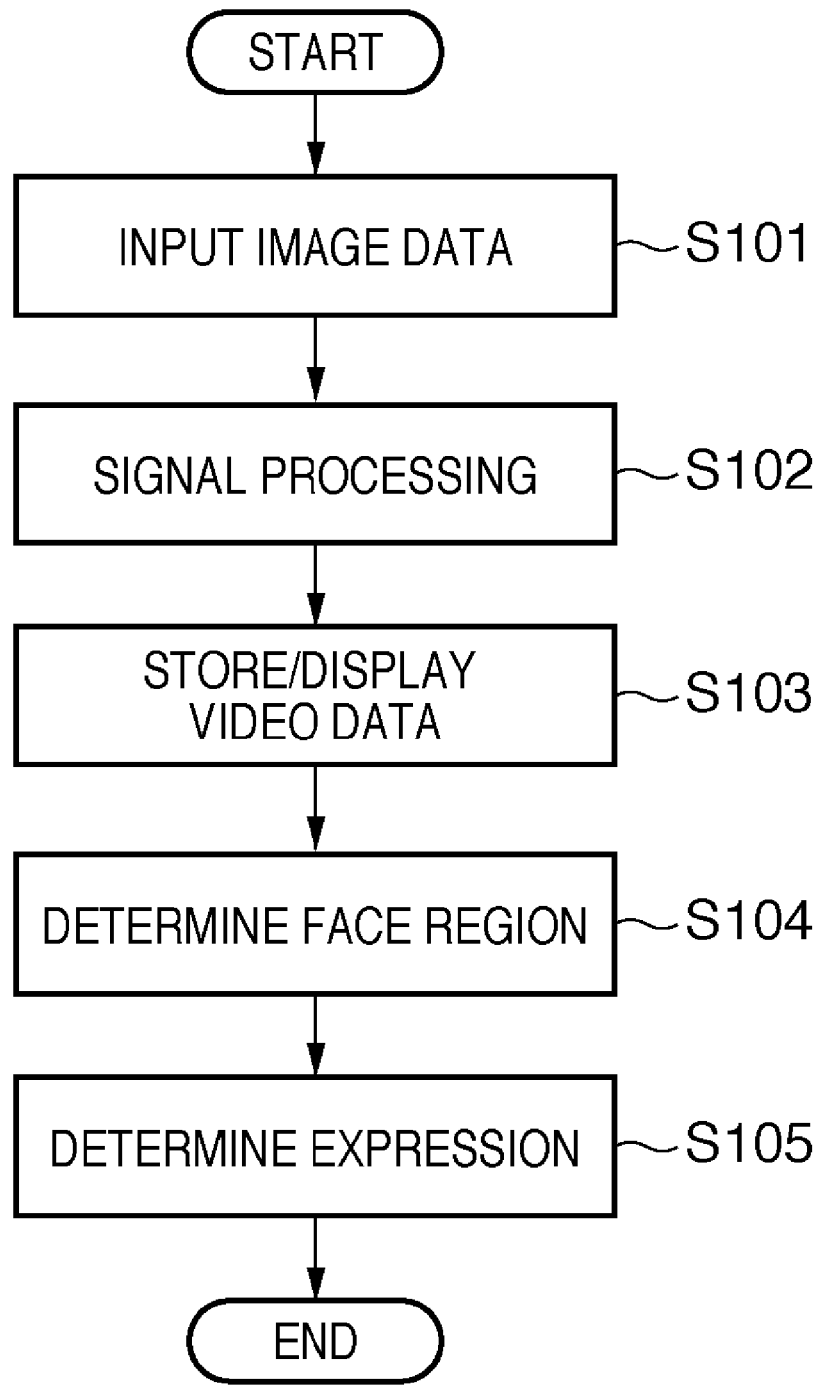
FIG. 2 is a flowchart showing operation of a digital camera according to the first embodiment of the present invention.

Next, operation of the digital camera according to the first embodiment of the present invention will be described with reference to a flowchart shown in FIG. 2.

In the digital camera according to the present invention, the display unit 16 functions as an electronic viewfinder. Therefore, optical images of a subject are continuously captured with the image sensor 11, for example, with a period of 1/30 seconds, and the images thus generated are sequentially displayed on the display unit 16. The digital camera according to the present embodiment detects a face region and detects an expression of a face from images captured while the display unit 16 functions as an electronic viewfinder.

In S101, the image forming optical unit 10 forms an optical image of a subject on a receiving surface of the image sensor 11. The image sensor 11 converts the formed optical image of the subject into analog image signals.

In general, an image sensor is able to output (able to read out) images with multiple resolutions by switching the driving method. In the present embodiment, it is assumed that the image sensor is provided with three types of driving methods (reading modes), that is, high resolution/medium resolution/ low resolution.

Then, high resolution driving is carried out, for example, during still image shooting that reads out all of the pixels of the image sensor, and medium resolution driving is carried out, for example, during recording of VGA moving images (640×480 pixels). Furthermore, low resolution driving is carried out during generation of images to be displayed for allowing the display image 16 to function as an EVF, and during recording of QVGA moving images (320×240 pixels). However, the present invention is characterized in that driving is carried out with the resolution increased when expression detection is to be carried out, even in a case in which low resolution driving is being carried out.

The A/D conversion unit 12 converts analog image signals read out from the image sensor 11 into digital image signals, and inputs the digital image signals into the image processing unit 13.

In S102, the signal processing unit 13 applies gamma processing, interpolation processing, matrix conversion, etc. to the input image signals to generate color image signals. The signal processing unit 13 stores the obtained color image signals in the memory 15 via the memory I/F 14 (S103). It is to be noted that the resolution of the color image signals to be stored in the memory 15 varies depending on the operation mode of the digital camera in the present embodiment. The display unit 16 reads out the color image signals stored in the memory 15 via the memory I/F 14 and displays the read color image signals (S103).

In S104, the face region detecting unit 18 detects a region considered a face of a person (face region), using the color image signals stored in the memory 15. In this case, the face region detecting unit 18 converts the color image signals to a certain resolution (for example, 320×240 pixels), and detects the face region from the image with its resolution converted.

The detection of the face region can be carried out using any well-known method. For example, a method using an eigenface through principal component analysis can be used. For more detail, see M. A. Turk and A. P. Pentland, "Face recognition using eigenfaces", Proc. of IEEE Conf. on Computer Vision and Pattern Recognition, pp. 586-591, 1991.

In addition, a method using a feature point such as eyes, nose, or mouth, as described in Japanese Patent Laid-Open No. H9-251534, can be applied. In this method, a face region is detected by a pattern matching method with input image signals and multiple standard patterns.

In the present embodiment, it is assumed that the detection of the face region is carried out by the latter pattern matching method. The standard patterns to be used for the detection are stored in the memory 15 in advance.

In S105, the expression detection unit 19 detects, for the face region detected by the face region detecting unit 18, an expression such as, for example, a smile or closed eyes. Carrying out the expression detection only for the region determined as a face of a person allows the processing time required for expression detection to be reduced, as compared with a case in which expression detection is carried out for the entire image. It is to be noted that the expression detecting unit 19 carries out the expression detection for a region corresponding to the face region in a case in which the resolution of a image from which an expression is detected by the expression detecting unit 19 is different from the resolution of an image from which a face is detected by the face region detecting unit 18.

Smile detection can be carried out by a method based on pattern matching of the relative positions and shapes of the profile, eyes, and mouth of a face and shapes normalized in advance, as described in Japanese Patent Laid-Open No. 2004-294498.

Furthermore, as a detection method for closed eyes, a method as described in Japanese Patent Laid-Open No. H6-32154 can be used, in which an eye region is extracted on the basis of a black region inside the profile of a face and it is determined if the eyes are open or close from the maximum number of continuous black pixels contained in the extracted eye region.

It is to be noted that, in the present embodiment, the expressions detected by the expression detecting unit 19 are not limited to smiles and closed eyes, and expressions of human emotions, such as joy, anger, pathos, and humor, may be detected. Furthermore, the method for expression detection is not limited to the method described above, and any known detection method can be applied.

Next, switching the driving method for the image sensor 11 in the digital camera according to the present embodiment will be described with reference to a flowchart shown in FIG. 3.

During a period for generating images to be displayed, when reading out from the image sensor always with a medium resolution, the frame rate may be decreased more than in a case in which reading is carried out with a low resolution, or the speed of reading may need to be increased so as not to decrease the fame rate, resulting in increased power consumption.

Therefore, in the present embodiment, driving for low resolution reading is in principle carried out during a period for generating images to be displayed, and the driving method for the image sensor is switched to medium resolution reading only when an expression detection mode is set for detecting an expression of a subject. In a mode in which no expression detection is carried out, the low resolution reading is maintained.

In S201, the CPU 21 detects the state of the operation unit 20, and determines whether or not an instruction to change the operation mode is input.

In a case in which the instruction for changing the operation mode is input (Yes in S201), the CPU 21 confirms an ON/OFF setting of the expression detection mode in S202.

In a case in which the expression detection mode is ON (Yes in S202), the CPU 21 sets the operation mode of the digital camera to the expression detection mode in S203, and sets the driving method for the image sensor 11 to the medium resolution reading (S204).

On the other hand, in a case in which the expression detection mode is OFF (No in S202), the CPU 21 sets the operation mode of the digital camera to a normal mode in S205, and sets the driving method for the image sensor 11 to the low resolution reading (S206).

Here, the normal mode refers to an operation mode in which still image shooting is carried out immediately after pressing of the shutter button is detected. By contrast, the expression detection mode refers to an operation mode in which still image shooting is carried out when it is determined that the expression of a subject becomes a predetermined expression (for example, a smile) to be shot or is no longer an expression (for example, closed eyes) not to be shot, after detecting that the shutter button has been pressed.

As described above, the operation mode to be set is determined and the resolution of the images to be read out from the image sensor is changed depending on the set operation mode.

Figure 4:
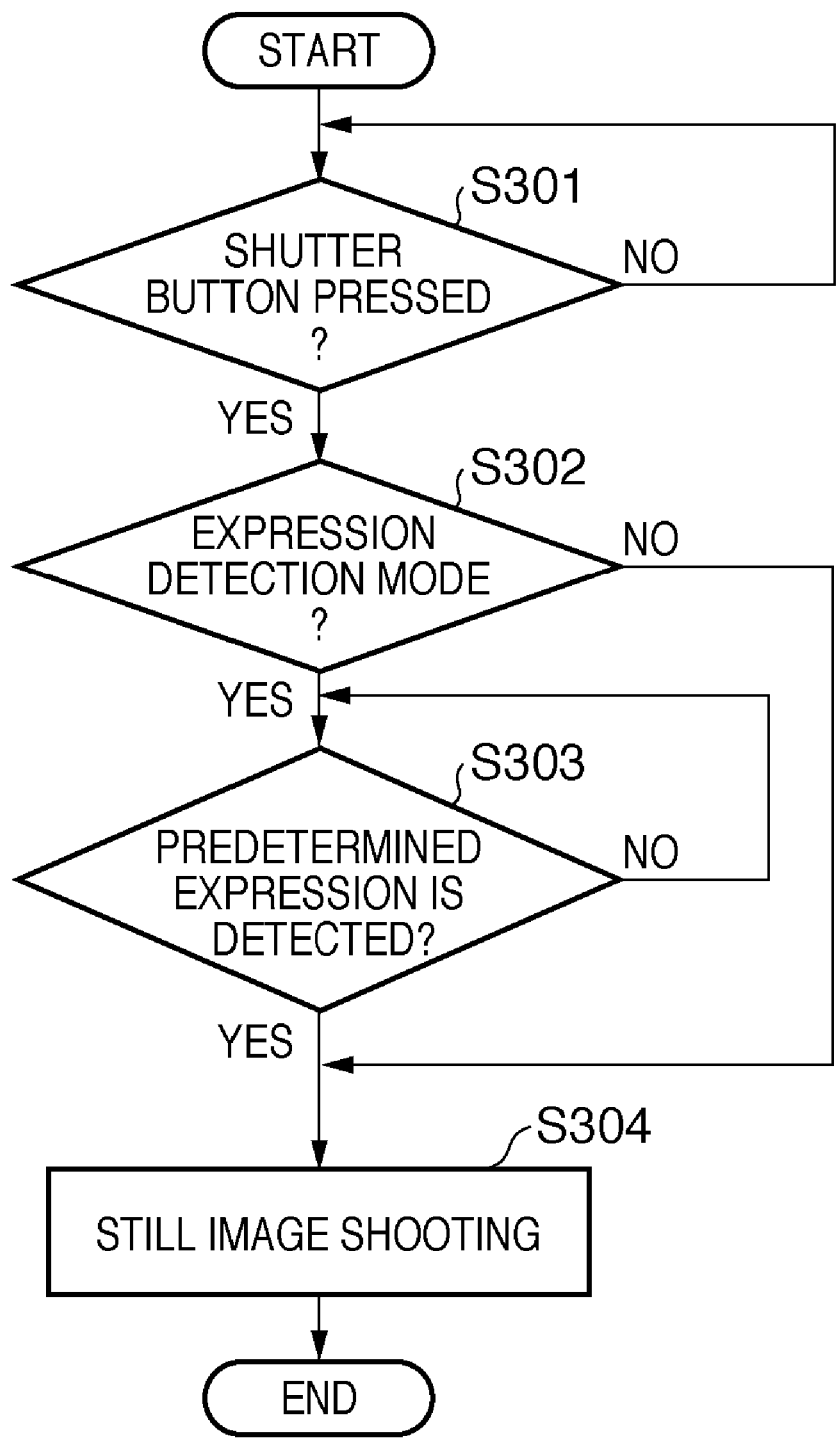
FIG. 4 is a flowchart showing an image capturing operation in a digital camera according to the first embodiment of the present invention.

Next, image capturing operation of the digital camera, when pressing of the shutter button included in the operation unit 20 is detected, will be described with reference to a flowchart shown in FIG. 4.

If the expression detection mode is set as the operation mode before pressing of the shutter button is detected, the driving method for the image sensor 11 is set to medium resolution reading, as described with reference to the flowchart in FIG. 3. Thus, face detection and expression detection (S104 and S105) are executed for images with medium resolution. On the other hand, if the expression detection mode is set to OFF, that is, if the operation mode of the digital camera is set to a normal mode, likewise the driving method for the image sensor 11 is set to low resolution reading, and face detection and expression detection are carried out from images with the low resolution.

In S301, the CPU 21 detects the state of the operation unit 20, and detects whether or not a shooting instruction is input from the user, that is, the shutter button is pressed. In a case in which pressing of the shutter button is detected, the CPU 21 determines in S302 if the operation mode is the expression detection mode or the normal mode.

In a case in which the operation mode is the expression detection mode, in S303 the CPU 21 detects, for a face region detected by the face region detecting unit 18, whether or not an expression detected by the expression detecting unit 19 is an expression as a preset execution criterion for shooting. The detection of the expression as the execution criterion for shooting may be detection of a desirable expression or detection of the fact that an expression is not undesirable for shooting. As described above, in a case in which the expression detection mode is set, the processing of S102 through S105 in FIG. 2 is executed for images with the medium resolution read out in S101.

In a case in which it is determined in S303 that the expression detecting unit 19 has detected an expression as a shooting criterion, the CPU 21 immediately executes the still image shooing processing (S304). As described above, in the still image shooing process, high resolution reading (for example, reading of all the pixels of the image sensor) is carried out from the image sensor 11.

On the other hand, in a case in which it is determined in S302 that the operation mode is the normal mode, the CPU 21 skips the expression detection determination process and immediately executes the still image shooting process (S304).

As described above, according to the first embodiment, in a case in which the operation mode for carrying out expression detection is set, the driving method for the image sensor is set so as to read out images with a resolution (number of pixels) higher than in a case in which the operation mode for carrying out expression detection is not set but lower than during still image shooting.

Accordingly, since low resolution reading is carried out in a case in which no expression detection is executed, it is not necessary to improve the reading speed, and the trackability can be satisfied without increasing the power consumption. At the same time, since reading with the resolution increased is carried out in a case in which expression detection is executed, the accuracy of the expression detection can be improved.

Second Embodiment

Next, a second embodiment of the present invention will be described. An image capturing apparatus according to the present embodiment may have a configuration in common with the first embodiment, except for the switching of the driving method for the image sensor 11 and the operation during shooting. Therefore, redundant descriptions will be omitted.

Figure 5:
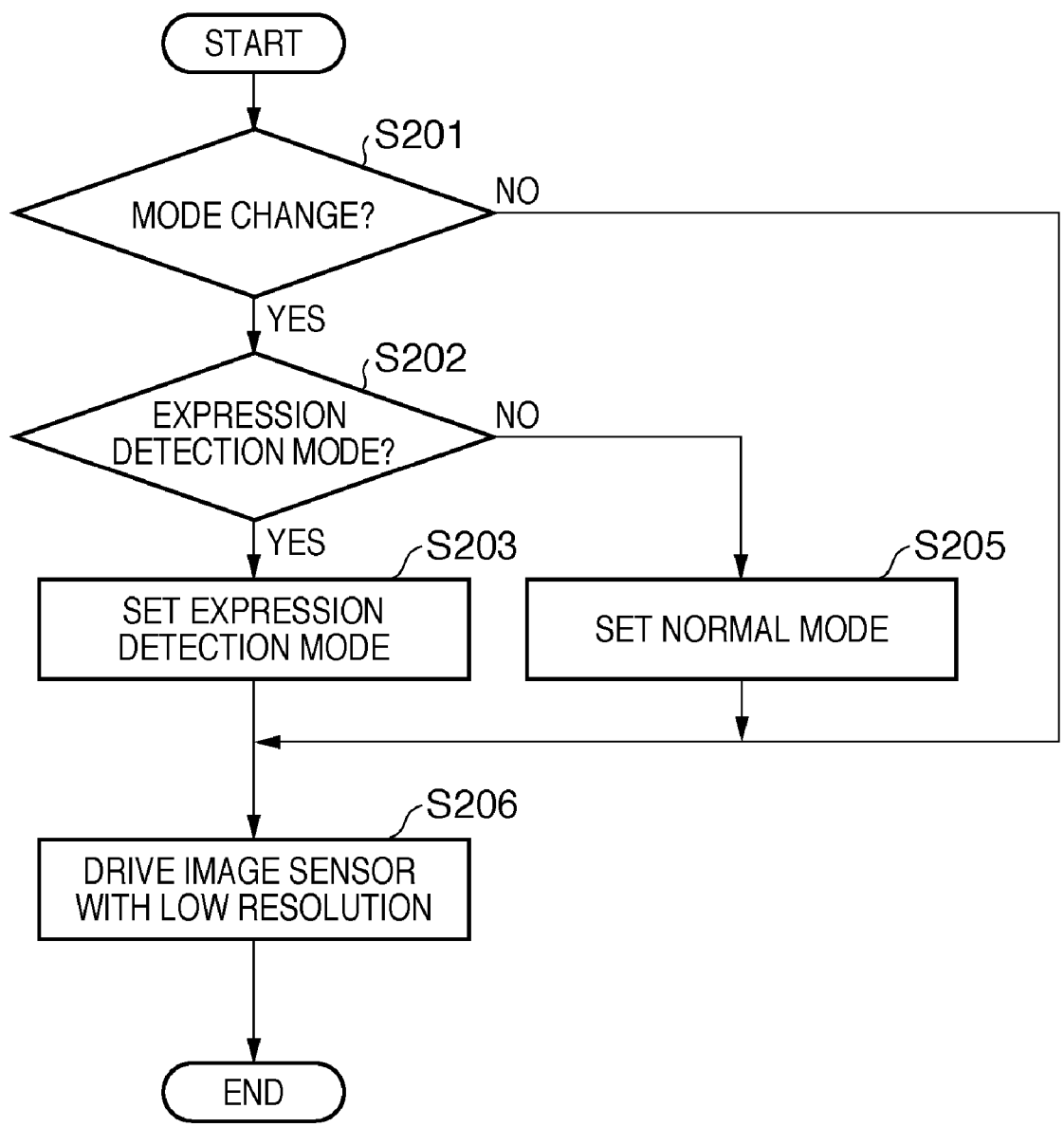
FIG. 5 is a flowchart showing switching a driving method for an image sensor in a digital camera according to a second embodiment of the present invention.

FIG. 5 is a flowchart for explaining switching of a driving method for the image sensor 11 in the second embodiment.

In the second embodiment, unlike the first embodiment, after the pressing of the shutter button is detected, the driving method for the image sensor 11 is set to a medium resolution in the case of an expression detection mode. When the operation mode of the digital camera is changed before the pressing of the shutter button is detected, the driving method for the image sensor 11 remains unchanged with a low resolution even in the case of the expression detection mode.

Therefore, the operation shown in FIG. 5 is equivalent to the operation in FIG. 3 with S204 removed in which the driving method is set to the medium resolution. It is to be noted that the processing of S206 is also unnecessary in the case of driving with the low resolution before changing the mode.

Figure 6:
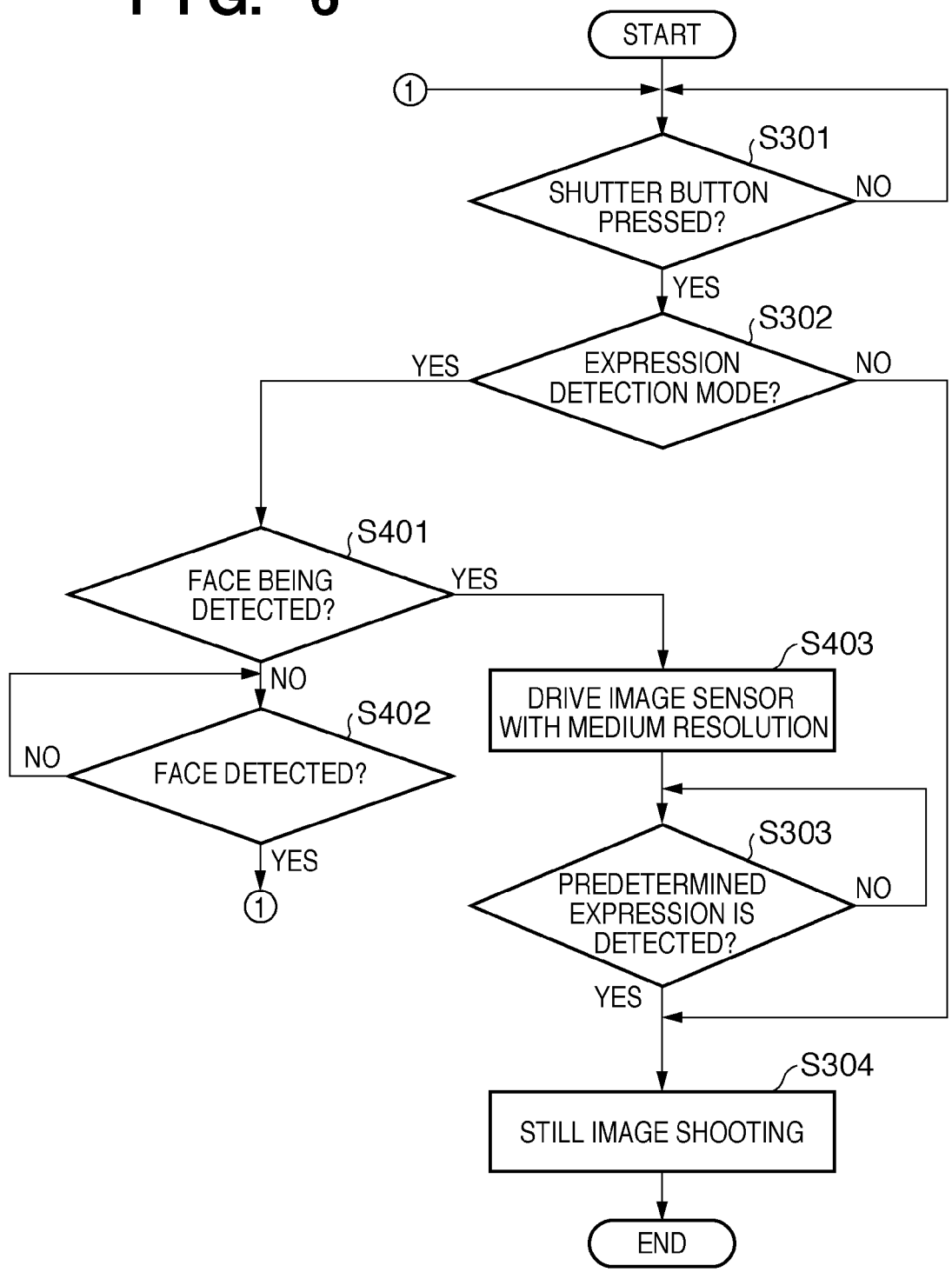
FIG. 6 is a flowchart showing an image capturing operation in a digital camera according to the second embodiment of the present invention.

Next, operation of the digital camera, when pressing of the shutter button included in the operation unit 20 is detected, will be described with reference to a flowchart shown in FIG. 6. In FIG. 6, the same processing steps as those in FIG. 4 are denoted by the same reference numerals, and redundant descriptions will be omitted.

It is to be noted that, as described above, in the present embodiment, the driving method for the image sensor 11 is set to the low resolution regardless of the setting of the operation mode (whether the expression detection mode or the normal mode), when the pressed shutter button is detected. Then, it is assumed that an image with low resolution is used to carry out detection of a face region (S104). It is to be noted that expression detection (S105) for the image with low resolution may or may not be carried out.

In S301, the CPU 21 detects the state of the operation unit 20, and determines whether or not the shutter button is pressed. In a case in which it is determined that the shutter button is pressed, the CPU 21 determines if the operation mode is the expression detection mode or the normal mode in S302.

In a case in which the operation mode is the expression detection mode, the CPU 21 confirms in S401 whether or not a face region has been detected. If no face region has been detected, the CPU 21 keeps the driving method for the image sensor 11 at the low resolution even when the operation mode is the expression detection mode. Then, the CPU 21 waits until a face region has been detected (S402), displays on the display unit 16 an instruction to press the shutter button again, and returns the processing to S301.

In a case in which it can be confirmed in S401 that a face has been detected, the CPU 21 proceeds with the processing to S403, in which the driving method for the image sensor 11 is set to the medium resolution.

In S303, expression detection is carried out for the face region detected. More specifically, the CPU 21 detects whether or not an expression detected by the expression detecting unit 19 is a preset desirable expression (an expression as a shooting criterion), for the face region detected by the face region detecting unit 18.

In a case in which it is determined in S303 that the expression detecting unit 19 has detected the expression as the shooting criterion, the CPU 21 immediately executes the still image shooing process (S304). As described above, in the still image shooing process, high resolution reading (for example, of all the pixels of the image sensor) is carried out from the image sensor 11.

On the other hand, in a case in which it is determined in S302 that the operation mode is the normal mode, the CPU 21 skips the expression detection determination process, and immediately executes the still image shooting process (S304).

It is to be noted that, in the present embodiment, a case has been described in which the reading resolution for the image sensor 11 is not increased (that is, remains at low resolution) before a face region is detected, even when the expression detection mode is set. However, at the point at which the setting of the expression detection mode is determined (Yes at S302), the driving method may be controlled so as to start medium resolution reading regardless of whether or not a face has been detected. Even in this case, it is after the detection of the pressed shutter button that the medium resolution reading is started. Therefore, the period for the medium resolution reading can be reduced more than in the first embodiment. Furthermore, in a case in which no face region has been detected due to the low resolution of the image, the time until succeeding in face detection is also reduced.

As described above, according to the second embodiment, in a case in which pressing of the shutter button is detected and the expression detection mode is set, control is exercised so as to increase the reading resolution for the image sensor. Therefore, as compared with the first embodiment, and still in the state of the expression detection mode being set, an increase in power consumption or a decrease in frame rate (that is, decrease in trackability) during a period before a shooting instruction can be prevented.

Furthermore, face detection can be carried out before detection of the pressing of the shutter button (that is, during a period of low resolution reading) by making use of the fact that face detection requires a lower image resolution than expression detection. As described above, the execution of face detection for an image with low resolution allows a region to be subjected to expression detection started after the pressed shutter button is detected to be determined immediately. Furthermore, when face detection is executed for an image with low resolution, whereas expression detection is executed for an image with medium resolution, it becomes possible to strike a better balance between detection speed and detection accuracy.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-202419, filed on Aug. 5, 2008, which is hereby incorporated by reference herein its entirety.

What is claimed is:

1. An image capturing apparatus comprising:
   an image outputting unit configured to be capable of outputting an image with one of multiple resolutions;
   a face detecting unit configured to detect a face region of a person from an image output from the image outputting unit;
   an expression detecting unit configured to detect an expression of the person from an image corresponding to the face region;
   an instruction detecting unit configured to detect a shooting instruction given by a user;
   a setting unit configured to set an operation mode of the image capturing apparatus to a first operation mode using the expression detecting unit or to a second operation mode without the use of the expression detecting unit; and
   a control unit configured to control the image outputting unit to output an image with a second resolution, regardless of the operation mode of the image capturing apparatus, until the shooting instruction is detected by the instruction detecting unit, and
   wherein the control unit further controls the image outputting unit to output an image with a first resolution being higher than the second resolution and provides the image with the first resolution to the expression detecting unit, if the shooting instruction is detected by the instruction detecting unit and the operation mode of the image capturing apparatus is set to in the first operation mode by the setting unit, and
   wherein the control unit further controls the image outputting unit to output the image with the second resolution, if the shooting instruction is detected by the instruction detecting unit and the operation mode of the image capturing apparatus is set to the second operation mode by the setting unit.

2. The image capturing apparatus according to claim 1, wherein the control unit further controls the image outputting unit to output an image with the first resolution and provides the image with the first resolution to the expression detecting unit, if the shooting instruction is detected by the instruction detecting unit, the operation mode of the image capturing apparatus is set to the first operation mode by the sensing unit, and a face region is detected by the face detecting unit.

3. An image capturing apparatus comprising:
   an image outputting unit configured to be capable of outputting an image with one of multiple resolutions;
   a face detecting unit configured to detect a face region of a person from an image output from the image outputting unit;
   an expression detecting unit configured to detect an expression of the person from an image corresponding to the face region;
   a setting unit configured to set an operation mode of the image capturing apparatus to a first operation mode using the expression detecting unit or a second operation mode without the use of the expression detecting unit; and
   a control unit configured to:
   control the image outputting unit to output an image with a first resolution being higher than a second resolution and provide the image with the first resolution to the expression detecting unit if the operation mode of the image capturing apparatus is set to the first operation mode by the setting unit;
   control the image outputting unit to output an image with the second resolution if the operation mode of the image capturing apparatus is set to the second operation mode by the setting unit; and
   control the image outputting unit to output an image with a third resolution being higher than the first resolution in response to a detection by the expression detecting unit of a predetermined expression.

4. A control method for an image capturing apparatus that comprises:
   an image outputting unit configured to be capable of outputting an image with one of multiple resolutions;
   a face detecting unit configured to detect a face region of a person from an image output from the image outputting unit;
   an expression detecting unit configured to detect an expression of the person from an image corresponding to the face region;
   an instruction detecting unit configured to detect a shooting instruction given by a user; and
   a setting unit configured to set an operation mode of the image capturing apparatus to a first operation mode using the expression detecting unit or to a second operation mode without the use of the expression detecting unit,
   the control method comprising:
   a first control step of controlling the image outputting unit to output an image with a second resolution, regardless of the operation mode of the image capturing apparatus, until the shooting instruction is detected by the instruction detecting unit;
   a second control step of controlling the image outputting unit to output an image with a first resolution being higher than the second resolution and providing the image with the first resolution to the expression detecting unit, if the shooting instruction is detected by the instruction detecting unit and the operation mode of the image capturing apparatus is set to the first operation mode by the setting unit; and a third control step of controlling the image outputting unit to output an image with the second resolution, if the shooting instruction is detected by the instruction detecting unit and the operation mode of the image capturing apparatus is set to the second operation mode by the setting unit.

5. A control method for an image capturing apparatus that comprises:

an image outputting unit configured to be capable of outputting an image with one of multiple resolutions;

a face detecting unit configured to detect a face region of a person from an image output from the image outputting unit;

an expression detecting unit configured to detect an expression of the person from an image corresponding to the face region; and a setting unit configured to set an operation mode of the image capturing apparatus to a first operation mode using the expression detecting unit or to a second operation mode without the use of the expression detecting unit, the control method comprising:

a first control step of controlling the image outputting unit to output an image with a first resolution being higher than the second resolution and providing the image with the first resolution to the expression detecting unit if the operation mode of the image capturing apparatus is set to the first operation mode by the setting unit;

a second control step of controlling the image outputting unit to output an image with the second resolution if the operation mode of the image capturing apparatus is set to the second operation mode by the setting unit; and a third control step of controlling the image outputting unit to output an image with a third resolution being higher than the first resolution in response to a detection by the expression detecting unit of a predetermined expression.

* * * * *